US012623416B2

(12) United States Patent     (10) Patent No.:   US 12,623,416 B2

Spindler et al.     (45) Date of Patent:    May 12, 2026

(54) DEVICE FOR INFLATING OR REPAIRING INFLATABLE ITEMS OR PRODUCTS AS NEEDED, IN PARTICULAR TIRES, PREFERABLY VEHICLE TIRES

(71) Applicant: Illinois Tool Works Inc., Glenview, IL (US)

(72) Inventors: Martin Spindler, Herdwangen-Schonach (DE); Maria Braun, Stockach (DE); Bruno Schulze Selting, Rielasingen-Worblingen (DE); Andreas Haring, Owingen (DE); Erwin Braun, Hohentengen (DE)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/723,854

(22) PCT Filed: Jan. 12, 2023

(86) PCT No.: PCT/US2023/010672

§ 371 (c)(1),
(2) Date: Jun. 24, 2024

(87) PCT Pub. No.: WO2023/141050

PCT Pub. Date: Jul. 27, 2023

(65) Prior Publication Data

US 2025/0065581 A1     Feb. 27, 2025

(30) Foreign Application Priority Data

Jan. 18, 2022    (DE) ..................... 10 2022 101 078.3

(51) Int. Cl.
    *B29C 73/16*      (2006.01)
    *B29L 30/00*      (2006.01)

(52) U.S. Cl.
    CPC ......... *B29C 73/166* (2013.01); *B29L 2030/00* (2013.01)

(58) Field of Classification Search
    CPC .............................. B29C 73/166; F04B 41/06
    See application file for complete search history.

(56) References Cited

U.S. PATENT DOCUMENTS 7,240,642 B2 *   7/2007   Chou ...................... F04B 35/04
                                                417/63
9,902,375 B2 *   2/2018   Wong .................... B29C 73/166
(Continued)

FOREIGN PATENT DOCUMENTS

DE     102008033477 A1    4/2010
DE     102008057827      5/2010
(Continued)

OTHER PUBLICATIONS

International Search Report and Written Opinion, with a mailing date of May 23, 2023, in International application No. PCT/US2023/010672, filed on Jan. 12, 2023 (10 pages).

*Primary Examiner* — Timothy P. Kelly
(74) *Attorney, Agent, or Firm* — McAndrews, Held & Malloy, Ltd.

(57)              ABSTRACT

A device (1) for inflating or repairing in particular vehicle tires, as needed, wherein the device (1) comprises a compressor unit (2) for supplying compressed air, a container (4) having a sealing liquid, and a distribution system (5), which is configured in order to fluidically connect the compressed air outlet (3) of the at least one compressor unit (2) to a compressed air inlet (6) of the scaling liquid container (4), as needed. According to the invention, it is provided in particular that the distribution system (5) is configured in order to automatically deliver compressed air exclusively to the item to be inflated or repaired when a first connector (8) of the distribution system (5) is fluidically connected to the (Continued)

Figure 1:
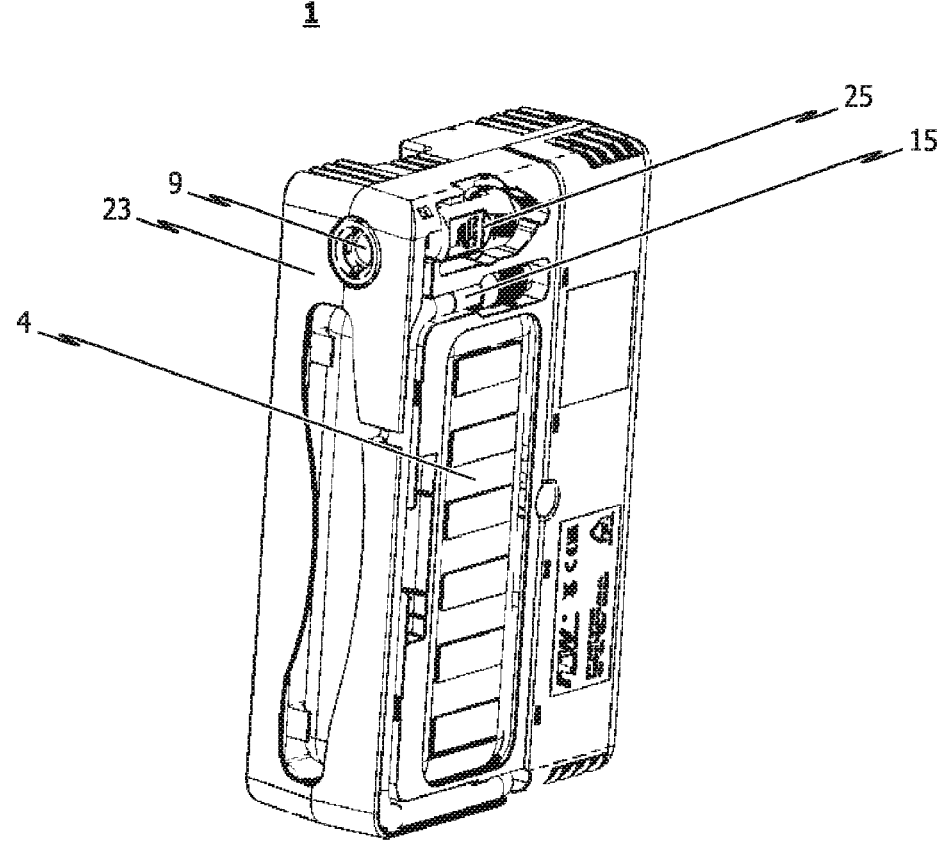

item and to deliver a sealing liquid/compressed air mixture to the item when a second connector (9) of the distribution system (5) is fluidically connected to the item.

18 Claims, 6 Drawing Sheets

(56) References Cited

U.S. PATENT DOCUMENTS

| | | | |
|---|---|---|---|
| 2010/0108185 A1* | 5/2010 | Chou | ...................... F04B 35/06 |
| | | | 417/415 |
| 2011/0011217 A1 | 1/2011 | Kojima | |
| 2012/0042987 A1 | 2/2012 | Lolli | |

FOREIGN PATENT DOCUMENTS

| | | |
|---|---|---|
| DE | 102010010361 A1 | 9/2011 |
| DE | 202015100123 U1 | 4/2015 |
| DE | 202020104030 U1 | 9/2020 |

* cited by examiner

DEVICE FOR INFLATING OR REPAIRING INFLATABLE ITEMS OR PRODUCTS AS NEEDED, IN PARTICULAR TIRES, PREFERABLY VEHICLE TIRES

CROSS REFERENCE TO RELATED APPLICATIONS

This application is a 371 of International Patent Application No. PCT/US23/010672, filed Jan. 12, 2023, which claims benefit of German Patent Application No. 10 2022 101 078.3, filed to the German Patent Office on Jan. 18, 2022, entitled "Device for Inflating or Repairing Inflatable Items or Products as Needed, in Particular Tires, Preferably Vehicle Tires," contents of both of which are hereby incorporated by reference in their entirety.

The present invention relates generally to tire repair kits and, in particular, to devices for dispensing tire sealants from a container by way of a compressed air source.

Tire sealants or sealing liquids for quickly repairing inflatable items or products are known as such. The liquid is introduced into the product or item for repair by means of compressed air, in particular by means of a compressor, penetrates all holes or slits in the product or item, and hardens through contact with air, thereby quickly sealing the product or item.

Such sealing liquids are widely used for the rapid repair of tires, in particular vehicle tires. The following description relates to these circumstances. However, the description is purely exemplary, is focused on clarity, and is not intended to be limiting.

Spare tires for vehicles raise a number of well-known problems, not the least of which are their notable size and weight. In particular, when the spare tire is accommodated inside the vehicle, the effective available capacity of the trunk is noticeably reduced, and the tire is frequently difficult to loosen or remove, in particular when the trunk is full.

Therefore, for vehicles, so-called tire repair kits have become common, which are used instead of a spare tire.

This is a built-in kit for repairing and inflating tires comprising a small compressor and a container for a sealing liquid, wherein this built-in kit can be easily accommodated in a special compartment or in the trunk of the car.

In addition to the noticeable size and weight reduction, the repair of a tire in the event of a flat tire has been proven to be faster and easier: unlike changing the vehicle tire, the compressor can be easily connected to a power outlet on the vehicle, wherein the container for the sealing liquid is then connected to the compressor as well as to the valve of the tire in order to carry out the repair.

Compressed air is forced into the container with the sealing liquid by means of the compressor, and the sealing liquid is then pumped into the defective tire via a valve through the corresponding rising pipes. Thereafter, the valve can be switched so that the tire can now be inflated by means of the compressor. Standard functions from the prior art are such that either only air is pumped, for example in order to inflate balls or air mattresses, or an air pressure control is carried out. In the repair function, the prior art is designed such that the sealant input and the air occurs in one pass.

What is disadvantageous in conventional tire repair kits is that the compressor can typically only be connected to the sealing fluid container with great effort with valves, changeover valves, mechanical devices, etc., in order to pressurize the container and to pump the tire sealant out of it and into the defective tires. In addition, conventional tire repair kits are usable in combinations, costly to install, complicated to operate, and frequently too heavy and too expensive to manufacture.

The present invention therefore addresses the problem of specifying a tire repair kit of the above-mentioned type, which eliminates the described disadvantages and can very quickly only inflate a vehicle tire or be supplied with tire sealant in a simple and inexpensive manner, without effort-intensive connection work and complicated handling by the user.

This problem is solved by the subject-matter of independent claim 1, which relates to a device for inflating or repairing inflatable items or products, in particular tires, preferably vehicle tires, as needed.

Advantageous further developments of the device according to the invention are specified in the dependent claims.

Accordingly, the invention relates in particular to a device for inflating or repairing inflatable items or products as needed, in particular tires, preferably vehicle tires, wherein the device comprises a compressor assembly having at least one compressor unit comprising a compressed air outlet, via which air that is compressed, in particular as needed, by the at least one compressor unit is supplied or suppliable. The device according to the invention further comprises a container having a sealing liquid and in particular a tire sealant. Furthermore, the device comprises a distribution system configured in order to fluidically connect the compressed air outlet of the at least one compressor unit as needed to a compressed air inlet of the sealing liquid container.

According to the present invention, it is provided in particular that the distribution system comprises a fluid passage, in particular configured as a manifold, with a first connector arranged preferably at a first end region of the fluid passage and a second connector arranged preferably at a second end region of the fluid passage arranged opposite the first end region. The first and second connectors of the distribution system are respectively configured in order to form, in particular via a connecting line preferably configured as a connecting hose, a fluid connection between the fluid passage of the distribution system and the item or product to be inflated or repaired.

The device according to the invention is in particular characterized in that the distribution system of the device is configured in order to deliver, automatically and in particular without manual switching or engagement, exclusively at least a portion of the compressed air supplied as needed by the at least one compressor unit to the item to be inflated or to be repaired when the first connector of the distribution system is fluidically connected to the item or product to be inflated or repaired, in particular via the connecting line preferably configured as a connecting hose. On the other hand, the distribution system is configured in order to deliver a sealing liquid/compressed air mixture to the item or product to be inflated or repaired when the second connector of the distribution system is fluidically connected to the item or product to be inflated or repaired, in particular via the connecting line preferably configured as a connecting hose The advantages achievable with the solution according to the invention are clear: in particular, the operability of the tire repair kit is significantly simplified, as no manual intervention is necessary on the part of the user in order to switch between a first operating state in which the product or item is only supplied with compressed air and a state in which a repair of the product or item occurs and the sealing liquid/compressed air mixture is fed to the product or item. Rather, the device according to the invention only comprises two connectors, namely a first connector, via which pure compressed air can be emitted in order to inflate the product or item, and a second connector via which the sealing liquid/compressed air mixture can be emitted for repairing the product or item. The user need only connect the connecting hose to either the first connector or the second connector of the distribution system in order to select the desired operating mode. A manual switching or actuation of valves is not necessary for this purpose.

Various embodiments can be considered for the implementation of the solution according to the invention:

According to a preferred implementation of the device according to the invention, it is provided that the first connector of the distribution system, i.e., the connector of the distribution system which provides pure compressed air for inflating the product or item, comprises a first valve assembly configured in order to seal the first connector when no connecting line preferably configured as a connecting hose is connected to the first connector, wherein, however, the first valve arrangement associated with the first connector of the distribution system fluidically opens the first connector when the connecting line preferably configured as a connecting hose is connected to the first connector.

Alternatively or additionally, it is conceivable that the second connector of the distribution system, i.e., the connector of the distribution system that provides the sealing liquid/compressed air mixture, comprises a second valve assembly configured in order to seal the second connector of the distribution system when no connecting line preferably configured as a connecting hose is connected to the second connector. On the other hand, the second valve assembly associated with the second connector of the distribution system is configured in order to fluidically open the second connector when the connecting line preferably configured as a connecting hose is connected to the second connector.

By providing such valve assemblies, it is ensured that compressed air or the sealing liquid/compressed air mixture is only output from the corresponding connectors of the distribution system when a connecting line, preferably configured as a connecting hose, is actually connected to the corresponding connector of the distribution system.

In a particularly easily implementable but nevertheless effective configuration of the first valve assembly of the distribution system, it is provided that the first valve assembly of the distribution system comprises a valve seat that is arranged in or on the first connector of the distribution system and a valve insert that is movable relative to the valve seat between an open position and a closed position and is biased to its closed position with the aid of a spring element. It is preferably provided in this context in particular that the first connector of the distribution system is in particular configured as a quick-action coupling connector and is configured in such a way that, when a coupling element compatible with the first connector is connected, the valve insert of the first valve assembly is moved into its open position (counter to the biasing force of the spring).

Similarly, with respect to the second valve assembly of the distribution system, it is conceivable that the second valve assembly comprises a valve seat arranged in or in the region of the second connector of the distribution system and a valve insert that is movable relative to the valve seat between an open position and a closed position and is preferably biased to its closed position with the aid of a spring element.

Again, it is preferred that the second connector of the distribution system is configured in particular as a quick-action coupling connector.

In particular, the second connector of the distribution system is configured in such a way that, when a coupling element of a connecting line preferably configured as a connecting hose and compatible with the second connector is connected, the valve insert of the second valve assembly is moved into its open position (counter to the biasing force of the spring).

Of course, however, other implementations of the first and/or second valve assembly are also possible.

According to configurations of the device according to the invention, the distribution system comprises a third valve assembly configured in order to block or interrupt a fluid connection between the fluid passage of the distribution system, in particular a first region of the fluid passage of the distribution system, and the compressed air inlet of the sealing liquid container when the second connector of the distribution system is not fluidically connected to the item or product to be inflated or repaired.

On the other hand, the third valve assembly is configured in order to supply a fluid connection between the fluid passage of the distribution system, in particular a first region of the fluid passage of the distribution system, and the compressed air inlet of the sealing liquid container when the second connector of the distribution system is fluidically connected to the item or product to be inflated or repaired.

In this context, it can be appreciated that the third valve assembly comprises, in particular at least regionally and preferably in the first region, the fluid passage of the distribution system, a valve seat and a valve insert that is movable relative to the valve seat of the third valve assembly between an open position and a closed position. The third valve assembly is preferably configured such that it is in its closed position when no coupling element of a connecting line preferably configured as a connecting hose and compatible with the second connector of the distribution system is connected to the second connector of the distribution system. However, the third valve assembly should (automatically) be in its open position when a coupling element of the connecting line preferably configured as a connecting hose and compatible with the second connector of the distribution system is fluidically connected to the second connector.

According to further developments of the last mentioned embodiment, it is provided in particular that the valve insert of the third valve assembly is preferably mechanically operatively connected to the valve insert of the second valve assembly, that is to say the valve assembly that is associated with the second connector of the distribution system, in such a way that the valve insert of the third valve assembly is coordinated and synchronized in its movement with the valve insert of the second valve assembly. In particular, the valve insert of the third valve assembly is preferably mechanically operatively connected to the valve insert of the second valve assembly in such a way that the valve insert of the third valve assembly is moved into its open position or is in its open position when the valve insert of the second valve assembly is moved into its open position or is in its open position.

On the other hand, the valve insert of the third valve assembly should be mechanically operatively connected to the valve insert of the second valve assembly such that the valve insert of the third valve assembly is moved into its closed position or is in its closed position when the valve insert of the second valve assembly is moved into its closed position or is in its closed position.

Various embodiments are considered for the realization of such a coordination of movement of the valve inserts of the third and second valve assemblies. According to a particularly easily implementable but nevertheless effective solution, it is provided that the valve insert of the third valve assembly is operatively connected to the valve insert of the second valve assembly via at least one force transfer element, in particular in the form of a push-pull bar, in such a way that the valve insert of the third valve assembly is moved into its open position or is in its open position when the valve insert of the second valve assembly is moved into its open position or is in its open position, and such that the valve insert of the third valve assembly is moved into its closed position or is in its closed position when the valve insert of the second valve assembly is moved into its closed position or is in its closed position.

According to realizations of the device according to the invention for repairing or inflating items or products as needed, it is provided that the distribution system comprises a third connector, via which the compressed air outlet of the at least one compressor unit is fluidically connected or (preferably releasably) connectable to the fluid passage of the distribution system in order to deliver the compressed air supplied by the at least one compressor unit, in particular as needed, to the fluid passage.

In this context, it can be appreciated that the third connector of the distribution system or the compressed air outlet of the at least one second compressor unit is preferably associated with a non-return valve, which is configured in order to permit a flow from the compressed air outlet of the at least one compressor unit in the direction of the fluid passage of the distribution system, wherein however upon reversing the flow direction, the non-return valve automatically closes and preferably also automatically (again) opens when the flow direction is permitted.

By providing such a non-return valve, it can be effectively prevented that fluid (compressed air or the sealing liquid/compressed air mixture) can pass through the compressed air outlet of the at least one compressor unit into the compressor unit, which can result in damage to the compressor unit.

According to a further development or alternative configuration of the device according to the invention, it is provided that the distribution system comprises a fourth connector, via which a first region of the fluid passage of the distribution system is fluidically connected or connectable to the compressed air inlet of the sealing liquid container, in particular as needed, and wherein the distribution system comprises a fifth connector, via which a second region of the fluid passage of the distribution system is fluidically connected or connectable to a sealing liquid/compressed air mixture outlet of the sealing liquid container, in particular as needed, wherein the second region of the fluid passage of the distribution system is fluidically connected to the second connector of the distribution system. Here, the second region of the fluid passage of the distribution system is fluidically connected to the second connector of the distribution system.

In particular, in a further development of the last mentioned design variant of the device according to the invention, it is provided that the distribution system further comprises a sixth connection, via which in particular the first region of the fluid passage of the distribution system is fluidically connected or connectable to a pressure measuring device (manometer). By providing such a pressure measuring device, the user of the device according to the invention can control the tire pressure on the device themselves.

According to further developments of the device according to the invention, the distribution system comprises a seventh connector, to which a safety valve is connected or connectable. The seventh connector preferably opens into the first region of the fluid passage of the distribution system. By providing such a safety valve, it is ensured that when the compressor assembly is activated, but neither at the first nor at the second connector of the device a fluid connection with a connecting line configured in particular as a connecting hose, an excessive positive pressure in the fluid passage, which can result in damage to the fluid passage or the device, is avoided.

The sealing liquid container is in particular releasably and preferably exchangeably connected or connectable to the fluid passage, which is in particular configured as a manifold. Thus, after use of the device for tire repair purposes, it can be reused, namely by replacing the now emptied or at least partially emptied sealing liquid container with a new (fresh) sealing liquid container.

The at least one compressor unit is preferably configured as a compressor having a piston compressor with a reciprocating piston pump unit.

A reciprocating piston pump is a displacement pump for conveying fluids, in which the displacer (piston) performs a lifting motion, i.e., a straight-line (translational) motion.

Of course, other configurations of the compressor unit are also conceivable, for example a configuration in the form of an in-line pump, in the form of a vibration, oscillating armature, or oscillating piston pump, or in the form of an axial piston pump or radial piston pump.

Preferably, the device according to the invention has a compact and encapsulated construction. For this purpose, it is conceivable in particular that the device comprises a housing in which the compressor assembly, the sealing liquid container, and the distribution system are accommodated at least partially or regionally and preferably completely.

The invention further relates to the aforementioned distribution system of the device, which is in particular configured as a tire repair kit, which is used for inflating or repairing inflatable items or products, in particular vehicle tires, as needed.

An exemplary embodiment of the invention is described in further detail below, with reference to the accompanying drawings.

Figure 2:
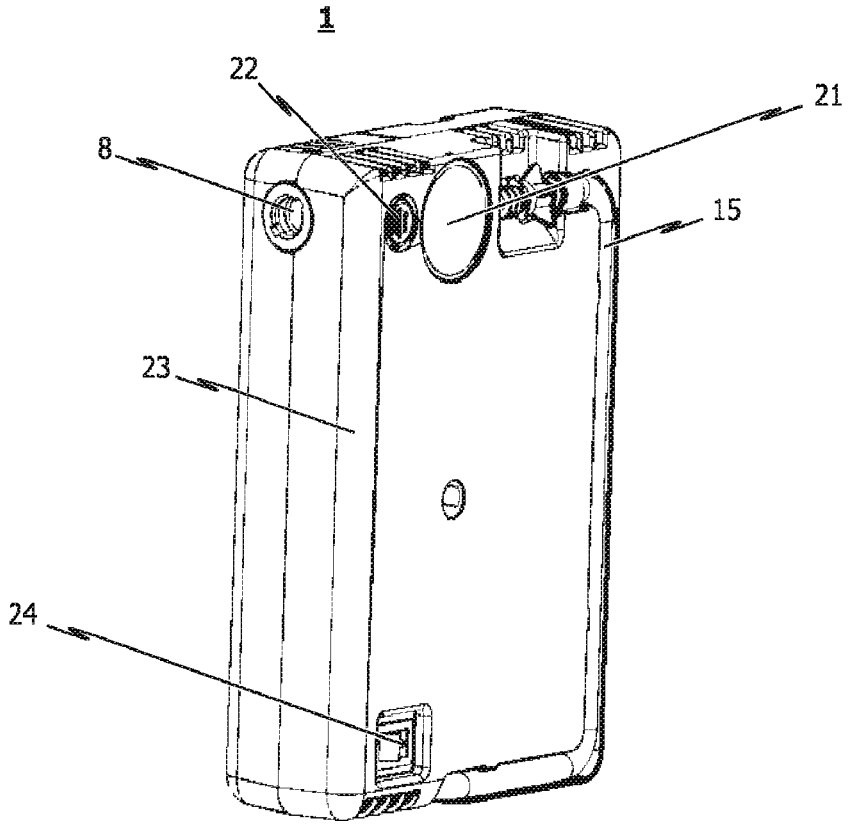
Figure 3:
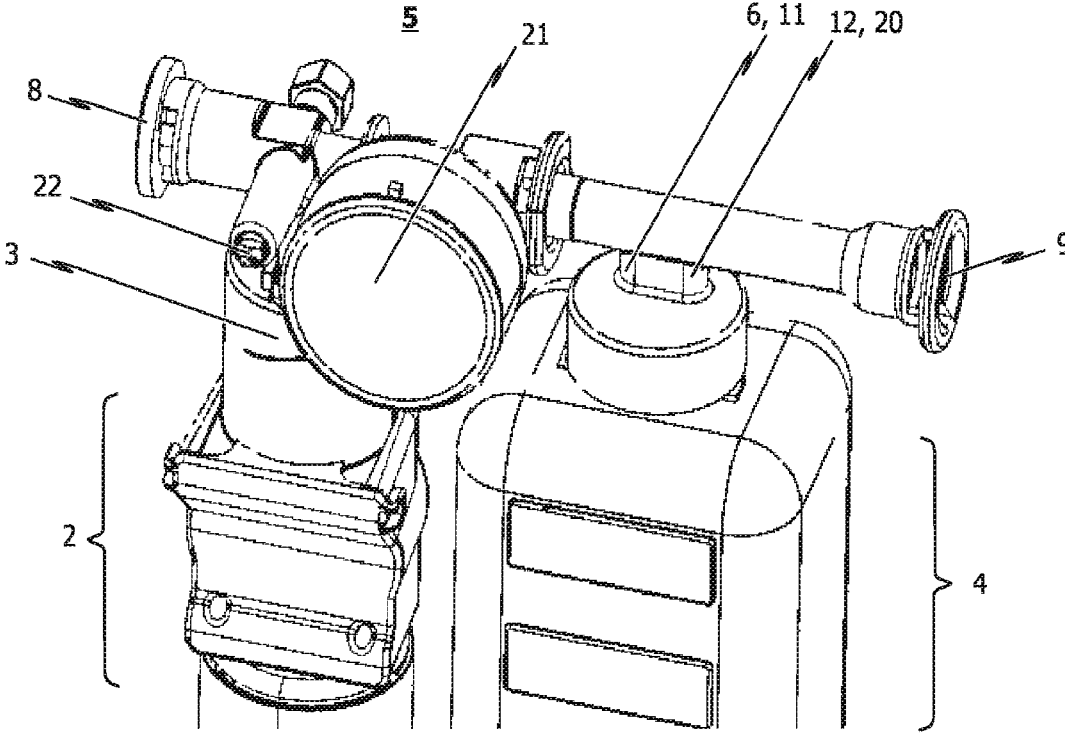
Figure 4:
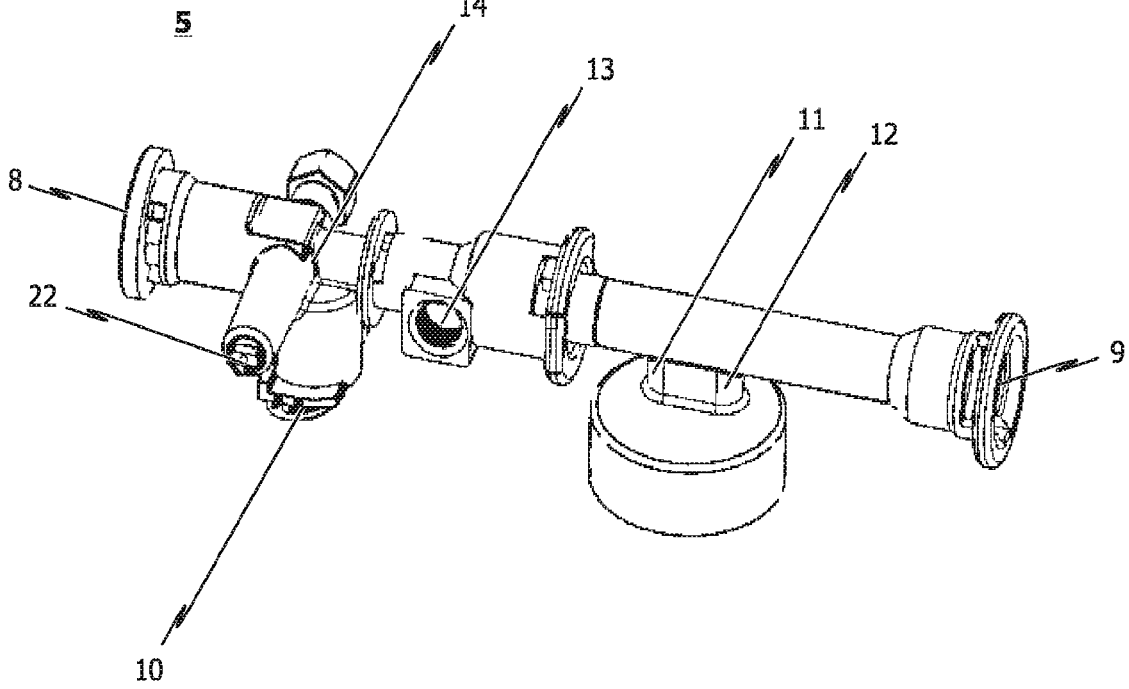
Figure 5:
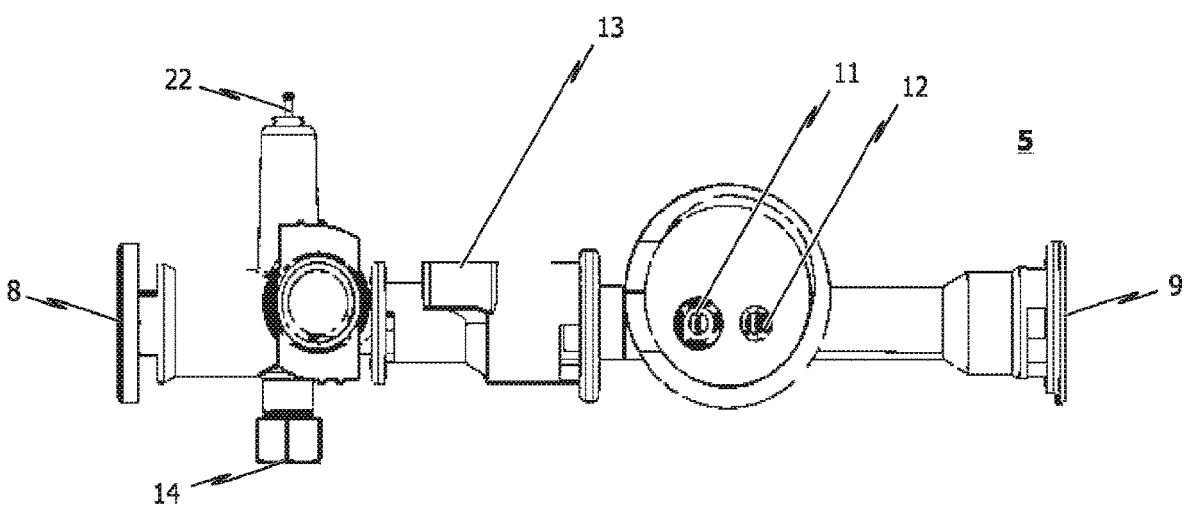
Figure 6:
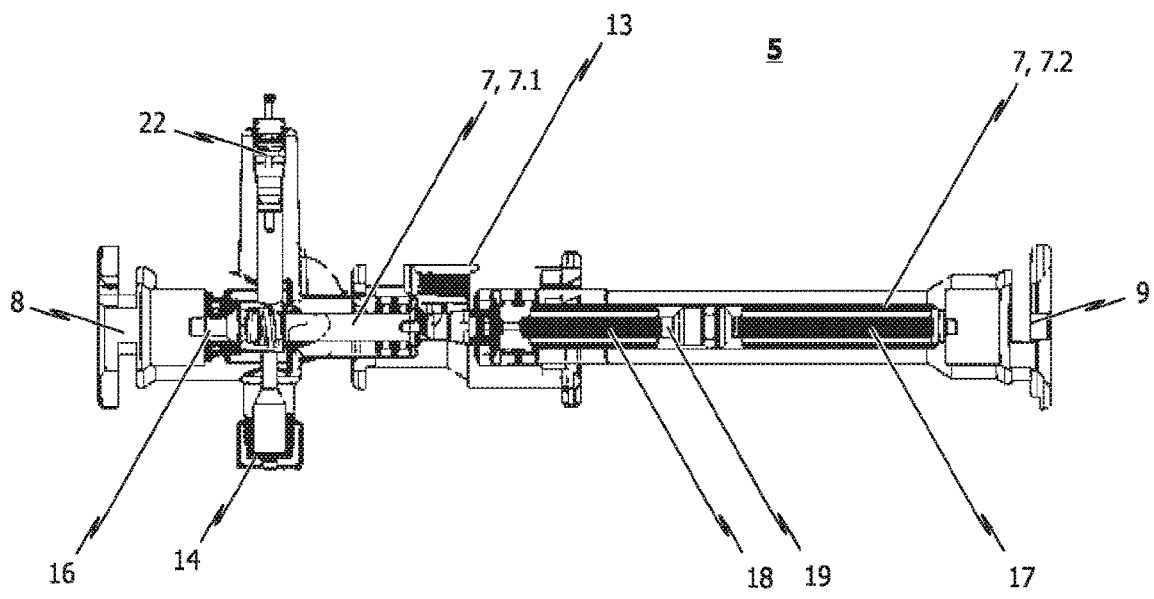
Figure 7:
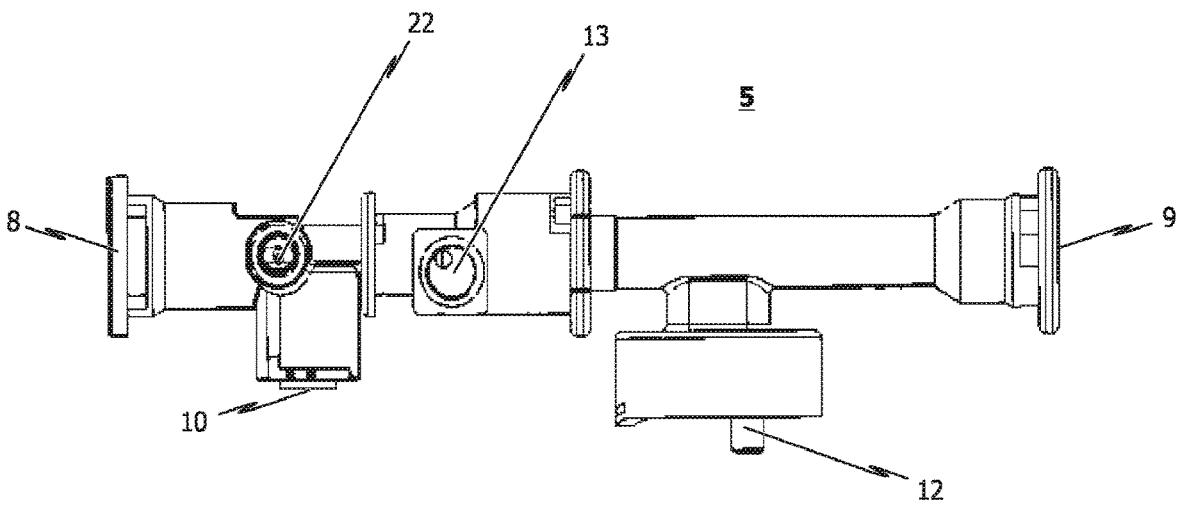
Figure 8:
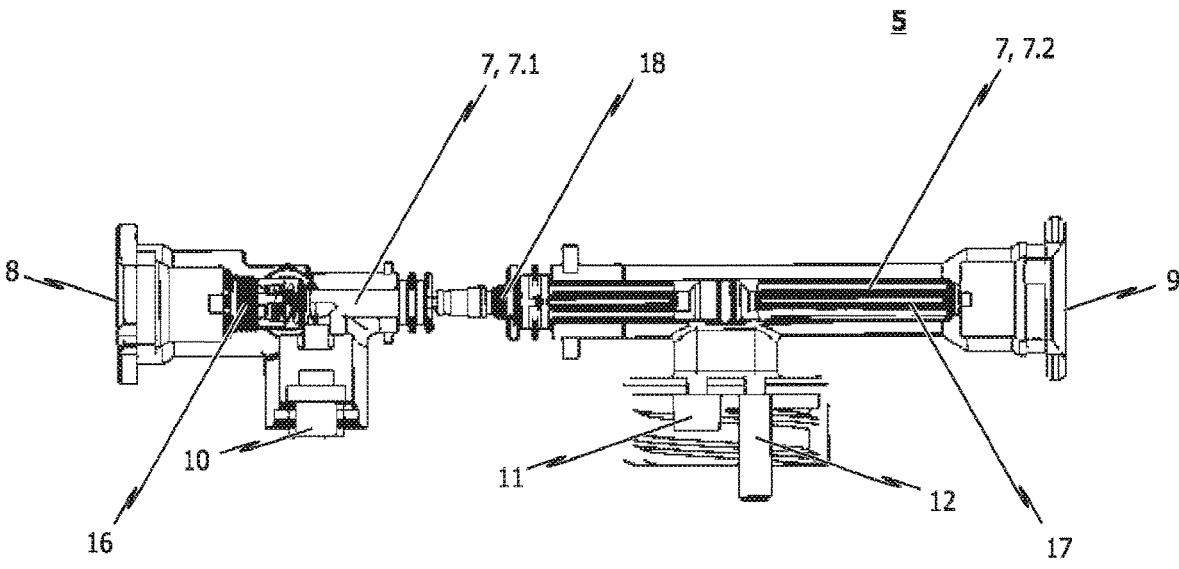

The following are shown:

FIG. 1 schematically and in a first isometric view, the exemplary embodiment of the device according to the invention for inflating or repairing inflatable items or products as needed;

FIG. 2 schematically and in a second isometric view, the exemplary embodiment of the device according to the invention according to FIG. 1;

FIG. 3 schematically and in an isometric view, the embodiment of the device according to the invention according to FIG. 1 or FIG. 2, namely without the housing of the device;

FIG. 4 schematically and in an isometric view, the distribution system, which is used in the exemplary embodiment of the device configured in particular as a tire repair kit according to FIG. 1 and FIG. 2;

FIG. 5 schematically and in a plan view from the bottom, the distribution system according to FIG. 4;

FIG. 6 schematically and in a longitudinal sectioned view, the distribution system according to FIG. 5;

FIG. 7 schematically and in a side view, the distribution system according to FIG. 4; and FIG. 8 schematically and in a longitudinal sectioned view, the distribution system according to FIG. 7.

The device 1 according to the invention for inflating or repairing inflatable items or products as needed, in particular vehicle tires such as preferably vehicle tires, comprises a housing 23 according to FIG. 1 or according to FIG. 2. This housing preferably consists substantially of an accommodating bowl and a cover releasably fastened to the accommodating bowl. In the accommodating bowl or cover, functional elements are provided in corresponding openings/cutouts. This is, for example, a switch 24 for switching on and off the device 100, a pressure measuring device 21 for measuring the pressure built up by a compressor assembly, or the internal pressure of a tire connected to the device 1 and, if applicable, a pressure relief button for relieving excess pressure.

The device 1 configured as a tire repair kit according to FIG. 1 and FIG. 2 further comprises a connecting line 15 configured as a connecting hose, via which a first connector 8 configured as a compressed air outlet of the device 1 or a second connector 9 configured as a sealing liquid/compressed air mixture outlet of the device 1 is connectable to the tire valve of a vehicle tire to be inflated or repaired (not shown in the drawings).

Moreover, the device 1 according to FIG. 1 or FIG. 2 comprises a power connector 25 with a cigarette connector coupling element, via which the device 1 can be galvanically connected in particular to an in-vehicle power supply (vehicle battery), as needed.

In the housing 23 of the device 1, a compressor assembly having at least one compressor unit 2 is accommodated, as can be schematically seen from the isometric view according to FIG. 3.

Further, a sealing liquid container 4 is stored in the housing 23. In this context, reference is made further to the illustration in FIG. 3.

The at least one compressor unit of the compressor assembly belonging to the device 1 according to the invention comprises a compressed air outlet 3, via which air that is compressed, in particular as needed, by the at least one compressor unit 2, is supplied or suppliable.

In the exemplary embodiment of the device 1 according to the invention shown in the drawings, the compressor unit 2 of the compressor assembly is configured in particular as a compressor having a piston compressor with a reciprocating piston pump unit. Of course, other designs for the compressor unit 2 of the compressor assembly are also possible.

As can be seen from the isometric views in FIG. 1 and FIG. 2, the compressor assembly and/or the compressor unit 2 of the compressor assembly, as well as the aforementioned sealing liquid container 4 of the device 1, are preferably fully accommodated in the housing 23 of the device 1.

Further, a distribution system 5 is preferably fully accommodated in the housing 23 of the device 1. The distribution system will be described in further detail below, in particular with reference to the illustrations in FIG. 3 to FIG. 8.

The distribution system 5 is configured in order to fluidically connect the compressed air outlet 3 of the compressor unit 2 as needed to a compressed air inlet 6 of the sealing liquid container 4.

The exemplary embodiment of the device 1 according to the invention shown in the drawings is in particular characterized by the special configuration of the distribution system 5. It comprises a fluid passage 7, which is in particular configured as a manifold and comprises a first connector 8, which is arranged at a first end region of the fluid passage 7, and a second connector 9, which is arranged at an opposite second end region of the fluid passage 7.

As will be described in further detail below with reference to the sectioned views in FIG. 6 and FIG. 8, the first and second connectors 8, 9 of the distribution system 5 are respectively configured in order to form a fluid connection between the fluid passage 7 of the distribution system 5 and the tire to be inflated or repaired (not shown in the drawings), in particular via the connecting line 15 of the device 1 configured as a connecting hose. In particular, the distribution system 5 is configured in order to deliver, automatically and in particular without manual switching or engagement on the part of the operator of the device 1, exclusively at least a portion of the compressed air supplied as needed by the compressor unit 2 to the vehicle tire to be inflated or to be repaired when the first connector 8 of the distribution system 5 is fluidically connected to the vehicle tire to be inflated or repaired via the connecting line 15 configured as a connecting hose. On the other hand, the distribution system 5 is configured in order to automatically deliver a sealing liquid/compressed air mixture to the vehicle tire to be inflated or repaired when the second connector 9 of the distribution system 5 is fluidically connected to the vehicle tire to be inflated or repaired via the connecting line 15 configured as a connecting hose.

As can be seen in particular from the sectioned views in FIG. 6 and FIG. 8, in the exemplary embodiment of the device 1 according to the invention shown in the drawings, it is provided that the first connector 8 of the distribution system 5 comprises a first valve assembly 16, which is configured in order to seal the first connector 8 when no connecting line 15 configured in particular as a connecting hose is fluidically connected to the first connector 8. On the other hand, the first valve assembly 16 associated with the first connector 8 of the distribution system 5 is configured in order to fluidically open the first connector 8 when the connecting line 15 preferably configured as a connecting hose is connected to the first connector 8.

It can further be seen in the sectioned views according to FIG. 6 and FIG. 8 that the second connector 9 of the distribution system 5 comprises a second valve assembly 17, which is configured in order to fluidically seal the second connector 9 when no connecting line 15 preferably configured as a connecting hose is connected to the second connector 9. On the other hand, the second valve assembly 17 associated with the second connector 9 of the distribution system 5 is configured in order to fluidically open the second connector 9 when a, or the, connecting line 15 preferably configured as a connecting hose is connected to the second connector 9.

Specifically, as can be seen from the sectioned views in FIG. 6 and FIG. 8, the first valve assembly 16 associated with the first connector 8 of the distribution system 5 comprises a valve seat that is arranged in the first connector or in the region of the first connector 8 of the distribution system 5 and a valve insert that is movable relative to the valve seat between an open position and a closed position and is biased to its closed position.

In this context, it is provided in particular that the first connector 8 of the distribution system 5 is in particular configured as a quick-action coupling connector and is configured in such a way that, when a coupling element of the connecting line 15 configured as a connecting hose and compatible with the first connector 8 is connected, the valve insert of the first valve assembly 16 is moved into its open position (counter to the biasing force of the spring).

Similarly, the second valve assembly 17, i.e., the valve assembly associated with the second connector 9 of the device 1, comprises a valve seat arranged in or in the region of the second connector 9 of the distribution system 5 and a valve insert that is movable relative to the valve seat between an open position and a closed position and is preferably biased to its closed position with the aid of a spring element.

Here, too, it is preferably provided that the second connector 9 of the distribution system 5 is formed in particular as a quick-action coupling connector and configured in such a way that, when a coupling element of a connecting line 15 preferably configured as a connecting hose and compatible with the second connector 9 is connected, the valve insert of the second valve assembly 17 is moved into its open position (counter to the biasing force of the spring).

Further, it can be seen from sectioned views shown in FIG. 6 and FIG. 8 that the distribution system 5 comprises a third valve assembly 18 configured in order to block or interrupt a fluid connection between a first region 7.1 of the fluid passage 7 of the distribution system 5, and the compressed air inlet 6 of the sealing liquid container 4 when the second connector 9 of the distribution system 5 is not fluidically connected to the vehicle tire to be inflated or repaired. On the other hand, the third valve assembly 18 is configured in order to supply or form a fluid connection between a first region 7.1 of the fluid passage 7 of the distribution system 5 and the compressed air inlet 6 of the sealing liquid container 4 when the second connector 9 of the distribution system 5 is fluidically connected to the item (vehicle tire) to be inflated or repaired, preferably via the connecting line 15 configured as a connecting hose.

In the exemplary embodiment of the device according to the invention shown in the drawings, it is provided in this context that the third valve assembly 18 comprises, in particular at least regionally and preferably in the first region 7.1 of the fluid passage 7 of the distribution system 5, a valve seat and a valve insert that is movable relative to the valve seat of the third valve assembly 18 between an open position and a closed position. The third valve assembly 18 is configured such that it is in its closed position when no coupling element of the connecting line 15 in particular configured as a connecting hose and compatible with the second connector 9 of the distribution system 5 is connected to the second connector 9, and such that it is in its open position when a coupling element of the connecting line 15 in particular configured as a connecting hose and compatible with the second connector 9 of the distribution system 5 is connected to the second connector 9.

In this context, it is provided in particular that the valve insert of the third valve assembly 18 is mechanically operatively connected to the valve insert of the second valve assembly 17 in such a way that the valve insert of the third valve assembly 18 is in its open position or is moved into its open position when the valve insert of the second valve assembly 17 is moved into its open position or is in its open position, and such that the valve insert of the third valve assembly 18 is moved into its closed position or is in its closed position when the valve insert of the second valve assembly 17 is moved into its closed position or is in its closed position.

In the exemplary embodiment shown in the drawings, this operative connection or coupling between the valve inserts of the second and third valve assemblies 17, 18 occurs via a force transfer element in the form of a push-pull bar 19.

In particular, it can be seen from the isometric view in FIG. 4 that the exemplary embodiment of the distribution system 5 belonging to the device 1 according to the invention comprises a third connector 10, via which the compressed air outlet 3 of the compressor unit 2 of the compressor assembly is fluidically connected or connectable, preferably releasably or exchangeably, to the fluid passage 7 of the distribution system 5 in order to deliver the compressed air supplied by the compressor unit 2, in particular as needed, to the fluid passage 7.

In this context, it is conceivable that the third connector 10 of the distribution system 5 or the compressed air outlet 3 of the compressor unit 2 is associated with a non-return valve (not shown in the drawings), which is configured in order to permit a flow from the compressed air outlet 3 of the compressor unit 2 in the direction of the fluid passage 7 of the distribution system 5, wherein, upon reversing the flow direction, the non-return valve automatically closes and preferably also automatically opens when the flow direction is permitted.

Further, it can be seen in particular from the isometric view in FIG. 4 that, in the embodiment of the distribution system 5 shown in the drawings, it comprises a fourth connector 11, via which the first region 7.1 of the fluid passage 7 of the distribution system 5 is fluidically connected or connectable to the compressed air inlet 6 of the sealing liquid container, in particular as needed.

Similarly, the distribution system 5 comprises a fifth connector 12 via which a second region 7.2 of the fluid passage 7 of the distribution system 5 is fluidically connected or connectable to a sealing liquid/compressed air mixture outlet 20 of the sealing liquid container 4, in particular as needed. Here, the second region 7.2 of the fluid passage 7 of the distribution system 5 is fluidically connected to the second connector 9 of the distribution system 5.

The distribution system 5 can further comprise a sixth connector 13, via which in particular the first region 7.1 of the fluid passage 7 of the distribution system 5 is fluidically connected or connectable to a pressure measuring device/manometer 21.

Further, the distribution system 5 can comprise a seventh connector to which a safety valve 22 is connected or connectable. A manual pressure relief can also be carried out via this safety valve 22 when the first connector 8 of the distribution system 5 is fluidically connected to the vehicle tire by means of the connecting line 15, which is configured in particular as a connecting hose.

The invention is not limited to the embodiments shown in the drawings, but rather results when all of the features disclosed herein are considered together.

LIST OF REFERENCE NUMERALS

1 Device for inflating or repairing inflatable items/products as needed, in particular tires
2 Compressor unit
3 Compressed air outlet of the compressor unit
4 Sealing liquid container
5 Distribution system
6 Compressed air inlet of the sealing liquid container
7 Fluid passage of the distribution system
7.1 First region of the fluid passage of the distribution system
7.2 Second region of the fluid passage of the distribution system
8 First connector of the distribution system
9 Second connector of the distribution system
10 Third connector of the distribution system
11 Fourth connector of the distribution system
12 Fifth connector of the distribution system
13 Sixth connector of the distribution system 14 Seventh connector of the distribution system 15 Connecting line/connecting hose 16 First valve assembly of the distribution system 17 Second valve assembly of the distribution system 18 Third valve assembly of the distribution system 19 Force transfer element/push-pull bar 20 Sealing liquid/compressed air mixture outlet of the sealing liquid container 21 Pressure measuring device/manometer 22 Safety valve/pressure relief valve 23 Housing 24 Switch 25 Power connector

The invention claimed is:

1. A device for inflating or repairing inflatable items, wherein the device comprises:

a compressor assembly having at least one compressor unit comprising a compressed air outlet, via which air that is compressed by the at least one compressor unit, is suppliable;

a sealing liquid container having a sealing liquid; and a distribution system configured in order to fluidically connect the compressed air outlet of the at least one compressor unit as needed to a compressed air inlet of the sealing liquid container, wherein the distribution system includes a fluid passage with a first connector arranged at a first end region of the fluid passage and a second connector arranged at a second end region of the fluid passage arranged opposite the first end region, wherein the first and second connectors of the distribution system are respectively configured in order to form; via a connecting line a fluid connection between the fluid passage of the distribution system and the item, wherein the distribution system is configured in order to deliver, automatically and without manual switching or engagement, at least a portion of the compressed air supplied by the at least one compressor unit to the item when the first connector of the distribution system is fluidically connected to the item via the connecting line, and to deliver a sealing liquid/compressed air mixture to the item when the second connector of the distribution system is fluidically connected to the item via the connecting line, wherein the first connector of the distribution system comprises a first valve assembly configured to seal the first connector when no connecting line is connected to the first connector and to fluidically open the first connector when the connecting line is connected to the first connector, and wherein the second connector of the distribution system comprises a second valve assembly configured to seal the second connector when no connecting line is connected to the second connector and to fluidically open the second connector when the connecting line is connected to the second connector.

2. The device according to claim 1, wherein the first valve assembly of the distribution system comprises a valve seat that is arranged in or on the first connector of the distribution system and a valve insert that is movable relative to the valve seat between an open position and a closed position and is biased to its closed position, and wherein the first connector of the distribution system is configured as a quick-action coupling connector and is formed in such a way that, when a coupling element compatible with the first connector is connected, the valve insert of the first valve assembly is moved into its open position.

3. The device according to claim 1, wherein the second valve assembly of the distribution system has a valve seat arranged in or on the second connector of the distribution system and a valve insert movable to the valve seat relative to the valve seat between an open position and a closed position and biased to its closed position, and wherein the second connector of the distribution system is configured and formed as a quick-action coupling connector, in that when a coupling element compatible with the second connector is connected, the valve insert of the second valve assembly is moved into its open position.

4. The device according to claim 3, wherein the distribution system comprises a third valve assembly configured to block a fluid connection between a first region of the fluid passage of the distribution system and the compressed air inlet of the sealing liquid container when the second connector of the distribution system is not fluidically connected to the item, wherein the third valve assembly is configured to supply a fluid connection between the first region of the fluid passage of the distribution system and the compressed air inlet of the sealing liquid container when the second connector of the distribution system is fluidically connected to the item.

5. The device according to claim 4, wherein the third valve assembly comprises a valve seat and a valve insert that is movable relative to the valve seat of the third valve assembly between an open position and a closed position, wherein the third valve assembly is configured such that it is in its closed position when no coupling element compatible with the second connector of the distribution system is connected to the second connector, and such that it is in its open position when a coupling element compatible with the second connector of the distribution system is connected to the second connector.

6. The device according to claim 5, wherein the valve insert of the third valve assembly is mechanically operatively connected to the valve insert of the second valve assembly in such a way that the valve insert of the third valve assembly is moved into its open position when the valve insert of the second valve assembly is moved into its open position or is in its open position, and such that the valve insert of the third valve assembly is moved into its closed position when the valve insert of the second valve assembly is moved into its closed position or is in its closed position.

7. The device according to claim 6, wherein the valve insert of the third valve assembly is operatively connected to the valve insert of the second valve assembly via at least one force transfer element, in the form of a push-pull bar, in such a way that the valve insert of the third valve assembly is moved into its open position when the valve insert of the second valve assembly is moved into its open position or is in its open position, and such that the valve insert of the third valve assembly is moved into its closed position when the valve insert of the second valve assembly is moved into its closed position or is in its closed position.

8. The device according to claim 1, wherein the distribution system comprises a third connector, via which the compressed air outlet of the at least one compressor unit is fluidically connected or connectable to the fluid passage of the distribution system in order to deliver the compressed air supplied by the at least one compressor unit to the fluid passage, wherein the third connector of the distribution system or the compressed air outlet of the at least one compressor unit is associated with a non-return valve, which is configured in order permit a flow of the compressed air outlet of the at least one compressor unit in the direction of the fluid passage of the distribution system, wherein, when the flow direction is reversed, the non-return valve automatically closes, when the flow direction is permitted, automatically opens.

9. The device according to claim 1,
wherein the distribution system comprises a fourth connector, via which a first region of the fluid passage of the distribution system is fluidically connectable to the compressed air inlet of the sealing liquid container and wherein the distribution system comprises a fifth connector, via which a second region of the fluid passage of the distribution system is fluidically connectable to a sealing liquid/compressed air mixture outlet of the sealing liquid container, wherein the second region of the fluid passage of the distribution system is fluidically connected to the second connector of the distribution system.

10. The device according to claim 1, wherein the distribution system comprises a sixth connector, via which the first region of the fluid passage of the distribution system is fluidically connected or connectable to a pressure measuring device.

11. The device according to claim 1,
wherein the distribution system comprises a seventh connector, wherein the seventh connector is provided in the first region of the fluid passage of the distribution system, and wherein the seventh connector is configured such that a safety valve or pressure outlet valve is connectable thereto.

12. The device according to claim 1,
wherein the sealing liquid container is releasably and exchangeably connectable to the fluid passage.

13. The device according to claim 1,
wherein the at least one compressor unit is configured as a compressor with a piston compressor having a reciprocating piston pump unit.

14. The device according to claim 1,
wherein the device comprises a housing in which the compressor assembly, the sealing liquid container, and the distribution system are accommodated at least partially.

15. A device for inflating or repairing inflatable items, wherein the device comprises:
a compressor assembly having at least one compressor unit comprising a compressed air outlet, via which air that is compressed by the at least one compressor unit is suppliable;
a sealing liquid container having a sealing liquid; and
a distribution system configured in order to fluidically connect the compressed air outlet of the at least one compressor unit as needed to a compressed air inlet of the sealing liquid container,
wherein the distribution system includes a fluid passage with a first connector arranged at a first end region of the fluid passage and a second connector arranged at a second end region of the fluid passage arranged opposite the first end region, wherein the first and second connectors of the distribution system are respectively configured in order to form via a connecting line, a fluid connection between the fluid passage of the distribution system and the item, wherein the distribution system is configured in order to deliver, automatically and without manual switching or engagement, at least a portion of the compressed air supplied by the at least one compressor unit to the item when the first connector of the distribution system is fluidically connected to the item via the connecting line, and to deliver a sealing liquid/compressed air mixture to the item when the second connector of the distribution system is fluidically connected to the item via the connecting line,
wherein the distribution system comprises a third valve assembly configured to block a fluid connection between a first region of the fluid passage of the distribution system and the compressed air inlet of the sealing liquid container when the second connector of the distribution system is not fluidically connected to the item, wherein the third valve assembly is configured to supply a fluid connection between the first region of the fluid passage of the distribution system and the compressed air inlet of the sealing liquid container when the second connector of the distribution system is fluidically connected to the item.

16. The device according to claim 15,
wherein the third valve assembly comprises a valve seat and a valve insert that is movable relative to the valve seat of the third valve assembly between an open position and a closed position, wherein the third valve assembly is configured such that it is in its closed position when no coupling element compatible with the second connector of the distribution system is connected to the second connector, and such that it is in its open position when a coupling element compatible with the second connector of the distribution system is connected to the second connector.

17. The device according to claim 16,
wherein the second connector of the distribution system comprises a second valve assembly configured to seal the second connector when no connecting line is connected to the second connector and to fluidically open the second connector when the connecting line is connected to the second connector, and
wherein the valve insert of the third valve assembly is mechanically operatively connected to the valve insert of the second valve assembly in such a way that the valve insert of the third valve assembly is moved into its open position when the valve insert of the second valve assembly is moved into its open position or is in its open position, and such that the valve insert of the third valve assembly is moved into its closed position when the valve insert of the second valve assembly is moved into its closed position or is in its closed position.

18. The device according to claim 17,
wherein the valve insert of the third valve assembly is operatively connected to the valve insert of the second valve assembly via at least one force transfer element, in such a way that the valve insert of the third valve assembly is moved into its open position when the valve insert of the second valve assembly is moved into its open position or is in its open position, and such that the valve insert of the third valve assembly is moved into its closed position when the valve insert of the second valve assembly is moved into its closed position or is in its closed position.

* * * * *